(12) United States Patent
Wegner et al.

(10) Patent No.: US 8,211,504 B2
(45) Date of Patent: *Jul. 3, 2012

(54) METHOD FOR PRODUCING COLOR GIVING AND/OR EFFECT GIVING LACQUER COATINGS

(75) Inventors: Egon Wegner, Veitshöchheim (DE); Ingo Lüer, Margetshöchheim (DE); Stephan Schwarte, Emsdetten (DE); Frank Jansing, Tauberbischofsheim (DE)

(73) Assignee: BASF Coatings GmbH, Münster (DE)

( * ) Notice: Subject to any disclaimer, the term of this patent is extended or adjusted under 35 U.S.C. 154(b) by 1661 days.

This patent is subject to a terminal disclaimer.

(21) Appl. No.: 10/344,743

(22) PCT Filed: Sep. 4, 2001

(86) PCT No.: PCT/EP01/10145
§ 371 (c)(1),
(2), (4) Date: Feb. 14, 2003

(87) PCT Pub. No.: WO02/20672
PCT Pub. Date: Mar. 14, 2002

(65) Prior Publication Data
US 2003/0175434 A1   Sep. 18, 2003

(30) Foreign Application Priority Data
Sep. 4, 2000 (DE) .................. 100 43 405

(51) Int. Cl.
*B05D 1/38* (2006.01)
(52) U.S. Cl. .................. 427/407.1; 427/385.5
(58) Field of Classification Search .......... 427/407.1, 427/385.5
See application file for complete search history.

(56) References Cited

U.S. PATENT DOCUMENTS

| | | | | |
|---|---|---|---|---|
| 3,449,272 A * | 6/1969 | Peffer et al. | ................. | 525/54.2 |
| 4,075,141 A * | 2/1978 | Porter et al. | ................. | 524/56 |
| 4,147,679 A * | 4/1979 | Scriven et al. | ................. | 523/404 |
| 4,743,470 A | 5/1988 | Nachtkamp et al. | ......... | 427/246 |
| 5,510,148 A * | 4/1996 | Taljan et al. | ................. | 427/409 |
| 5,635,236 A * | 6/1997 | Cooper | ......................... | 426/531 |
| 5,716,676 A | 2/1998 | Schütze et al. | ............ | 427/385.5 |
| 5,747,582 A | 5/1998 | Schütze et al. | ................. | 524/591 |
| 5,976,343 A * | 11/1999 | Schlaak | ....................... | 205/198 |
| 6,001,424 A * | 12/1999 | Lettmann et al. | ........... | 427/407.1 |
| 6,069,218 A * | 5/2000 | Vogt-Birnbrich et al. | .... | 526/301 |
| 6,129,989 A | 10/2000 | Sapper | ......................... | 428/500 |
| 6,291,018 B1 * | 9/2001 | Dattilo | ......................... | 427/377 |
| 6,548,119 B1 * | 4/2003 | Siever et al. | ............... | 427/407.1 |
| 6,602,972 B1 * | 8/2003 | Schwarte et al. | ............ | 528/45 |
| 6,607,788 B1 * | 8/2003 | Wegner et al. | ............ | 427/388.4 |

FOREIGN PATENT DOCUMENTS

| | | |
|---|---|---|
| CA | 2059420 | 1/1992 |
| CA | 2078650 | 10/1992 |
| CA | 2102169 | 11/1993 |
| CA | 2102170 | 11/1993 |
| CA | 2104845 | 2/1994 |
| CA | 2127761 | 11/1994 |
| CA | 2073814 | 10/1999 |
| CA | 2073115 | 8/2002 |
| DE | 35 22 464 | 1/1987 |
| DE | 39 03 704 | 8/1990 |
| DE | 40 09 858 | 10/1991 |
| DE | 43 28 092 | 2/1995 |
| DE | 197 36 535 | 1/1999 |
| DE | 197 41 554 | 6/1999 |
| EP | 0 297 576 | 6/1988 |
| EP | 0 313 951 | 10/1988 |
| EP | 0 469 389 | 7/1991 |
| WO | WO 91/14514 | 10/1991 |

OTHER PUBLICATIONS

Meixenburg, et al., U.S. Appl. No. 09/485,982, filed Feb. 17, 2000, entitled "Multi-layer paints and Method for producing the same" pp. 1-42 and Abstract.
Wegner, et al., U.S. Appl. No. 09/486,103, filed Feb. 21, 2000, entitled "Method for producing multiplayer coating", p. 1-51.
English Abstract for DE 4328092.
English Abstract for EP 297 576.
English Abstract for EP 313 951.
English Abstract for DE 3903704.
English Abstract for DE 4009858.

* cited by examiner

*Primary Examiner* — Elena T Lightfoot
(74) *Attorney, Agent, or Firm* — Harness, Dickey & Pierce, P.L.C.

(57) ABSTRACT

Process for producing a color and/or effect coating system on a substrate by applying an aqueous color and/or effect solid-color topcoat material or—alternatively—an aqueous color and/or effect basecoat material and a clearcoat material (wet-on-wet technique) to the substrate and curing the resultant coating films, which after curing have a water vapor permeability $\delta_{60°\ C.} > 6.0$ mg/h·m·bar or $p_{60°\ C.} > 286.4$ g·100 μm/m²·d, where d stands for day, when the coating material contains no metal flake pigments; or have a water vapor permeability $\delta_{60°\ C.} > 4.0$ mg/h·m·bar or $p_{60°\ C.} > 190.92$ g·100 μm/m²·d, when the coating material contains metal flake pigments.

15 Claims, No Drawings

METHOD FOR PRODUCING COLOR GIVING AND/OR EFFECT GIVING LACQUER COATINGS

CROSS REFERENCE TO RELATED APPLICATIONS

This application is a National Phase Application of Patent Application PCT/EP01/10145 filed on 4 Sep. 2001, which claims priority to DE 100 43 405.3, filed on 4 Sep. 2000.

The present invention relates to a novel process for producing color and/or effect coating systems.

Processes for producing color and/or effect coating systems from aqueous color and/or effect basecoats and aqueous solid-color topcoats, and the corresponding aqueous basecoats and aqueous solid-color topcoats, are known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522, 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 496 205 A1, EP 0 358 979 A1, EP 469 389 A1, DE 24 46 442 A1, DE 34 09 080 A1, DE 195 47 944 A1, DE 197 41 554.7 A1, and EP 0 817 684, column 5 lines 31 to 45.

The known aqueous basecoats and aqueous solid-color topcoats give multicoat color and/or effect coating systems and solid-color topcoats of outstanding optical quality, and exhibit excellent intercoat adhesion.

Normally, the aqueous basecoats in the multicoat color and/or effect coating systems are from 7 to 20 µm thick. In many cases it would be desirable to apply the aqueous basecoats in higher film thicknesses in order to realize specific optical effects. Applied at such thicknesses, however, the aqueous basecoats tend to develop popping marks, which greatly disrupt the visual appearance and give the impression of a poor-quality coating. The same is true when the known aqueous coating materials are used as solid-color topcoats.

It is an object of the present invention to find a novel process for producing color and/or effect coating systems, from which process the disadvantages of the prior art are now absent and which instead, while retaining—if not improving—the profile of properties achieved to date by the color and/or effect coating systems, permits the production of popping-free aqueous basecoats and solid-color topcoats, even in relatively high film thicknesses.

Accordingly there has been found the novel process for producing a color and/or effect coating system on a primed or unprimed substrate by (I) applying at least one aqueous color and/or effect solid-color topcoat material to the substrate, to give at least one solid-color topcoat film, and
(II) curing the aqueous solid-color topcoat film, to give a color and/or effect solid-color topcoat;

or alternatively by (I) applying at least one aqueous color and/or effect basecoat material to the substrate, to give at least one aqueous basecoat film,
(II) flashing off and/or drying the aqueous basecoat film(s), without curing it (them) fully,
(III) applying at least one clearcoat material to the aqueous basecoat film, to give at least one clearcoat film, and
(IV) jointly curing the aqueous basecoat film(s) and the clearcoat film(s), to give a multicoat color and/or effect coating system;

which involves (a) using at least one aqueous color and/or effect solid-color topcoat material or aqueous color and/or effect basecoat material which contains no metal flake pigments and which after curing gives a color and/or effect solid-color topcoat or aqueous basecoat having a water vapor permeability $\delta_{60°\,C.}>6.0$ mg/h·m·bar or $\delta_{60°\,C.}>286.4$ g·100 µm/m²·d, where d stands for day; or
(b) using at least one aqueous effect or color and effect solid-color topcoat material or aqueous effect or color and effect basecoat material which comprises metal flake pigments and which after curing gives a color and/or effect solid-color topcoat or aqueous basecoat having a water vapor permeability $\delta_{60°\,C.}>4.0$ mg/h·m·bar or $\delta_{60°\,C.}>190.92$ g·100 µm/m²·d.

Below, the novel process for producing a color and/or effect coating system on a primed or unprimed substrate is referred to as the "process of the invention".

In the light of the prior art it was surprising and unforeseeable for the skilled worker that the object on which the present invention is based might be achieved by means of the process of the invention. A particular surprise was that specifically the water vapor permeability, which plays an essential part in membrane technology, would be critical to solving the problem of the popping tendency. This was all the more surprising since membrane technology is entirely different from the technical field involved here.

The process of the invention is used to produce multicoat color and/or effect coating systems on primed or unprimed substrates.

Suitable coating substrates are all surfaces which are not damaged by curing of the coatings present thereon using heat and/or actinic radiation.

Suitable substrates comprise, for example, metals, plastics, wood, ceramic, stone, textile, fiber composites, leather, glass, glass fibers, glass wool, rock wool, mineral- and resin-bound building materials, such as plasterboard and cement slabs or roof tiles, and assemblies of these materials.

Accordingly, the process of the invention is outstandingly suitable for the coating of interior and exterior constructions, furniture, doors and windows, for the OEM finishing and refinishing of automobiles and for industrial coating, including coil coating, container coating, and the impregnation or coating of electrical components. In the context of industrial coatings, it is suitable for coating virtually all parts for private or industrial use, such as radiators, domestic appliances, small metal parts such as nuts and bolts, wheel caps, rims, packaging, or electrical components such as motor windings or transformer windings. Above all, however, the process of the invention is suitable for the OEM finishing and refinishing of automobiles.

In the case of electrically conductive substrates it is possible to use primers, which are produced in customary and known manner from electrodeposition coating materials. Both anodic and cathodic electrodeposition coating materials are suitable for this purpose, especially cathodic. In the case of metal, the substrate may also have been subjected to a surface treatment, such as by galvanizing or phosphating or eloxing.

In automotive OEM finishing, in particular, a surfacer or an antistonechip primer is applied to the fully cured or merely dried electrodeposition coat. The surfacer or primer film is fully cured either alone or together with the underlying electrodeposition film. The applied surfacer film may also be merely dried or partly cured, after which it is cured fully with the overlying coating films and, if appropriate, with the underlying electrodeposition film (extended wet-on-wet technique). In the context of the present invention, the concept of priming includes the combination of electrodeposition coat and surfacer coat or antistonechip primer.

Examples of suitable electrodeposition coating materials and, where appropriate, wet-on-wet techniques are described in Japanese patent application 1975-142501 (Japanese laid-open specification JP 52-065534 A2, Chemical Abstracts No. 87: 137427) and in U.S. Pat. Nos. 4,375,498 A1, 4,537,926 A1, 4,761,212 A1, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794. The thickness of the electrodeposition coats produced therefrom is normally from 5 to 70, preferably from 7 to 65, more preferably from 9 to 60, with particular preference from 11 to 55, with very particular preference from 13 to 50 and in particular from 15 to 45 µm.

Examples of suitable surfacer coats and antistonechip coats are described, for example, in patent applications and patents EP 0 427 028 A1, DE 41 42 816 A1, DE 38 05 629 C1, DE 31 08 861 C2 and DE 195 04 947 A1. Their thickness is usually from 10 to 100, preferably from 11 to 95, more preferably from 12 to 90, with particular preference from 13 to 85, with very particular preference from 14 to 80, and in particular from 15 to 75 µm.

Further examples of highly suitable substrates are primed or unprimed plastics moldings made from ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations to DIN 7728T1), polymer blends of these plastics, modified plastics, and fiber-reinforced plastics. Unfunctionalized and/or non-polar substrate surfaces may be subjected to a conventional pretreatment prior to coating, such as with a plasma or by flaming, or may be provided with a water-based primer.

In a first variant of the process of the invention, in the first step of the process, at least one aqueous color and/or effect solid-color topcoat material is applied to the substrate, to give at least one solid-color topcoat film.

In a second variant of the process of the invention, in the first step of the process, at least one aqueous color and/or effect basecoat material is applied to the substrate, to give at least one aqueous basecoat film.

Both the aqueous solid-color topcoat material and the aqueous basecoat material are curable physically, thermally or thermally and with actinic radiation.

In the context of the present invention, the term "physical curing" denotes the curing of a solid-color topcoat film or aqueous basecoat film by filming, with linkage within the coating taking place by way of looping of the polymer molecules of the binders (regarding the term, cf. Römpp Lexikon Lacke und Druckfarben, Georg Thieme Verlag, Stuttgart, New York, 1998, "Binders", pages 73 and 74). Alternatively, filming takes place by way of the coalescence of binder particles (cf. ibid., "Curing", pages 274 and 275). Normally, no crosslinking agents are required for this process. If desired, the physical curing may be assisted by atmospheric oxygen, by heat, or by exposure to actinic radiation.

The thermally curable aqueous solid-color topcoat materials or aqueous basecoat materials may be self-crosslinking or externally crosslinking.

In the context of the present invention, the term "self-crosslinking" denotes the capacity of a binder to undergo crosslinking reactions with itself. A prerequisite for this is that the binders include complementary reactive functional groups, which react with one another and so lead to crosslinking. Alternatively, the binders include reactive functional groups which react "with themselves". Externally crosslinking on the other hand, is a term used to refer to those aqueous solid-color topcoat materials and aqueous basecoat materials in which one kind of the complementary reactive functional groups is present in the binder and the other kind in a curing or crosslinking agent. For further details, reference is made to Römpp, op.cit., "Curing", pages 274 to 276, especially page 275, bottom.

The aqueous solid-color topcoat materials and aqueous basecoat materials may be curable thermally and with actinic radiation.

Curing with actinic radiation takes place via groups containing bonds which can be activated with actinic radiation. In the context of the present invention actinic radiation is electromagnetic radiation, such as visible light, UV radiation or X-rays, especially UV radiation, and corpuscular radiation such as electron beams.

Where thermal curing and curing with actinic radiation are employed jointly in the context of a solid-color topcoat material or aqueous basecoat material, the terms "dual cure" and "dual-cure solid-color topcoat or, respectively, aqueous basecoat" are used.

The aqueous solid-color topcoat materials and the aqueous basecoat materials which are curable thermally or thermally with actinic radiation may be one-component systems or two-component or multicomponent systems.

In the context of the present invention, a one-component system is a solid-color topcoat material or aqueous basecoat material wherein the binder and the crosslinking agent are present alongside one another in the coating material. A prerequisite of this is that the two constituents crosslink with one another only at relatively high temperatures and/or on exposure to actinic radiation. One-component systems are used in particular in automotive OEM finishing.

In contrast, a two-component or multicomponent system is a solid-color topcoat material or aqueous basecoat material wherein the crosslinking agent, owing to its high reactivity, is stored separately from the other constituents of the coating material and is only added to the other constituents a short time before the coating material is used. Two-component or multi-component systems are used especially in automotive refinishing.

Aqueous color and/or effect solid-color topcoats or basecoats that are particularly suitable for the process of the invention are aqueous coating materials based on ionically and/or nonionically stabilized polyurethanes which are saturated, unsaturated and/or grafted with olefinically unsaturated compounds, as described in detail in patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 B1, WO 92/15405, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 496 205 A1, EP 0 358 979 A1, EP 469 389 A1, DE 24 46 442 A1, DE 34 09 080 A1, DE 195 47 944 A1, DE 197 41 554 A1, and EP 0 817 684, column 5, lines 31 to 45.

The color pigments present therein may comprise organic or inorganic pigments. Examples of suitable pigments are naturally occurring pigments (cf. Römpp, op.cit., pages 400 and 467, "Naturally occurring pigments"), synthetic iron oxide pigments, polycyclic pigments (cf. ibid, page 459, "Polycyclic pigments"), azomethine pigments, azo pigments (cf. ibid, page 52, "Azomethine pigments", "Azo pigments"), and metal complex pigments (cf. ibid., page 379, "Metal complex pigments").

Effect pigments which may be used include metal flake pigments such as standard commercial aluminum bronzes, aluminum bronzes chromated in accordance with DE-A-36 36 183, standard commercial stainless steel bronzes, and nonmetallic effect pigments, such as pearlescent pigments and interference pigments, for example. For further details, reference is made to Römpp, op.cit., page 176, "Effect pigments" and pages 380 and 381, "Metal oxide mica pigments" to "Metal pigments", and to the patents and patent applications DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. Nos. 4,828,826 A and 5,244,649 A.

Where effect pigments used include metal flake pigments, the water vapor permeability is significantly reduced, so that in accordance with the invention a lower threshold value must be set.

The solid-color topcoat or aqueous basecoat material may be applied by any customary application method, such as spraying, knife coating, brushing, flow coating, dipping, impregnating, trickling or rolling, for example. The substrate to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed air spraying, airless spraying, high-speed rotation, electrostatic spraying application (ESTA), possibly in conjunction with hot spray application such as hot air spraying, for example. Application may take place at temperatures of max. 70 to 80° C., so that appropriate application viscosities are obtained without the brief thermal exposure being accompanied by any alteration in or damage to the solid-color topcoat or aqueous basecoat material or its overspray, which may be intended for reprocessing. Thus hot spraying may be configured such that the solid-color topcoat or aqueous basecoat material is heated only very briefly in the spray nozzle or only shortly before the spray nozzle.

The spray chamber used for the application may be operated, for example, with an optionally temperature-controllable circulation system, which is operated with an appropriate absorption medium for the overspray, an example of such medium being the solid-color topcoat or aqueous basecoat material itself.

Application preferably takes place under illumination with visible light having a wavelength of more than 550 μm or in the absence of light, if the solid-color topcoat or aqueous basecoat material is curable thermally and with actinic radiation. This prevents material alteration or damage to the solid-color topcoat or aqueous basecoat material and to the overspray.

The application methods described above may of course also be employed for the production of the other coating films in the context of the process of the invention.

In the context of the process of the invention, the solid-color topcoat film, following its application, is cured physically, thermally, or thermally and with actinic radiation.

Because of the large amount therein of pigments which strongly absorb and/or scatter actinic radiation, the solid-color topcoat film is preferably cured thermally. This is done using, preferably, the methods of thermal curing described below and, if desired, (dual cure), the methods of curing with actinic radiation that are described below.

For the physical curing of the solid-color topcoat film, no special measures need be taken.

In the case of thermal curing or dual cure of the solid-color topcoat film, the underlying coating films of the primer may be cured as well, if they have not yet been cured or have been only partly cured (wet-on-wet technique).

Curing may take place after a certain rest period. This period may have a duration of 30 s to 2 h, preferably from 1 min to 1 h, and in particular from 1 min to 45 min. The rest period is used, for example, for leveling and devolatilization of the solid-color topcoat film and for evaporation of volatile constituents such as water and any solvents that may be present (flashing off). The rest period or flashing off may be shortened and/or assisted by the application of elevated temperatures of up to 90° C. and/or by a reduced atmospheric humidity <10 g water/kg air, especially <5 g/kg air, provided this does not entail any damage or alteration to the coating films, such as premature complete crosslinking.

The thermal curing has no special features as to its method but instead takes place in accordance with the customary and known methods such as heating in a convection oven or irradiation with IR lamps. As with the curing with actinic radiation, described below, the thermal curing may also take place in stages.

In the case of one-component systems, the thermal curing takes place preferably at temperatures above 100° C. In general it is advisable here not to exceed temperatures of 180° C., preferably 170° C., and in particular 150° C. In the case of two-component or multicomponent systems, the thermal curing takes place preferably at temperatures below 100° C., preferably below 60° C.

Preferably, curing with actinic radiation is carried out with UV radiation and/or electron beams. It is preferred here to employ a dose of from 1,000 to 3,000, more preferably from 1,100 to 2,900, with particular preference from 1,200 to 2,800, with very particular preference from 1,300 to 2,700, and in particular from 1,400 to 2,600 mJ/cm$^2$. If desired, this curing may be supplemented with actinic radiation from other radiation sources. In the case of electron beams it is preferred to operate under an inert gas atmosphere. This may be ensured, for example, by applying carbon dioxide and/or nitrogen directly to the surface of the solid-color topcoat film. In the case of curing with UV radiation as well it is possible to operate under inert gas in order to prevent formation of ozone.

Curing with actinic radiation is carried out using the customary and known radiation sources and optical auxiliary measures. Examples of suitable radiation sources are flashlights from the company VISIT, high-pressure or low-pressure mercury vapor lamps, with or without lead doping in order to open up a radiation window at 405 nm, or electron beam sources. Their arrangement is known in principle and may be adapted to the circumstances of the workpiece and the process parameters. In the case of workpieces of complex shape, as envisaged for automobile bodies, those areas not accessible to direct radiation (shadow regions), such as cavities, folds and other structural undercuts, may be (partly) cured using point, small-area or all-round emitters in conjunction with automatic movement apparatus for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

Curing here may take place in stages, i.e., by multiple exposure to light or actinic radiation. It can also take place in alternation, i.e., by curing alternately with UV radiation and electron beams.

Where thermal curing and curing with actinic radiation are employed together, these methods may be used simultaneously or in alternation. Where the two curing methods are used alternately, it is possible, for example, to commence with the thermal curing and to end with the curing with actinic radiation. In other cases it may prove advantageous to commence and to end with curing with actinic radiation. Particular advantages result if the solid-color topcoat film is cured in two separate process steps, first with actinic radiation and then thermally.

Of course, the above-described curing methods in the context of the process of the invention may also be used for curing the other coating films, especially the aqueous basecoat films.

Curing gives the single-coat or multicoat solid-color topcoat, after which the first variant of the process of the invention is at an end. Preferably, the thickness of the solid-color topcoat is from 10 to 100, more preferably from 11 to 90, with particular preference from 12 to 80, with very particular preference from 13 to 70, and in particular from 14 to 60 µm.

In the second variant of the process of the invention, the aqueous basecoat film(s) is or are not cured, but instead just flashed off, dried or partly cured. In other words, none, or only some—for instance, up to 90, preferably up to 80, and in particular up to 70 mol %—of the reactive functional groups present that are capable of thermal crosslinking is reacted. During flashing off or the rest period, the conditions described above are employed.

In the case of the process of the invention, the aqueous basecoat film is overcoated (wet-on-wet technique) with at least one clearcoat material, using the application methods described above.

Examples of suitable clearcoats are one-component or multicomponent clearcoats, powder clearcoats, powder slurry clearcoats, UV-curable clearcoats, and sealers, as known from patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 and WO 92/22615, U.S. Pat. No. 5,474,811 A1, U.S. Pat. Nos. 5,356, 669 A1 and 5,605,965 A1, DE 42 22 194 A1, BASF Lacke+ Farben AG, "Pulverlacke" [Powder coating material], 1990, BASF Coatings AG "Pulverlacke, Pulverlacke für industrielle Anwendungen" [Powder coating materials, powder coatings for industrial applications], January 2000, U.S. Pat. No. 4,268,542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. Nos. 5,824,373 A, 4,675,234 A, 4,634,602 A, 4,424,252 A, 4,208, 313 A, 4,163,810 A, 4,129,488 A, 4,064,161 A, 3,974,303 A, EP 0 844 286 A1, DE 43 03 570 A1, DE 34 07 087 A1, DE 40 11 045 A1, DE 40 25 215 A1, DE 38 28 098 A1, DE 40 20 316 A1 and DE 41 22 743 A1.

In general, the aqueous basecoat film(s) and clearcoat film(s) are applied in a wet film thickness such that their conjoint curing results in coats having the thicknesses that are advantageous and necessary for their functions. In the case of the aqueous basecoat this is from 5 to 70, preferably from 6 to 65, with particular preference from 7 to 60, and in particular from 8 to 55 µm, and in the case of the clearcoats it is from 10 to 100, preferably from 15 to 80, with particular preference from 20 to 75 and in particular from 25 to 70 µm.

In the case of conjoint curing of the aqueous basecoat film(s) and clearcoat film(s), especially the aqueous basecoat film and the clearcoat film, the methods described above are employed. If desired, the underlying not yet fully cured coating films of the primer may be cured at the same time here (extended wet-on-wet technique).

In this context it is found a particular advantage of the process of the invention that it can be used to produce aqueous basecoats of particularly high film thickness that are free from surface defects, especially from popping marks. These particular advantages are retained if the aqueous basecoats are produced in film thicknesses >20, preferably >25, and in particular >30 µm. This particular advantage extends to the multicoat color and/or effect coating systems comprising these aqueous basecoats; they too are free from popping marks.

In accordance with the invention, this particular advantage is achieved by virtue of the fact that the aqueous solid-color topcoat materials or aqueous basecoat materials for use in accordance with the invention that contain no metal flake pigments are adjusted in terms of their material composition such that the solid-color topcoats or aqueous basecoats produced from them, after curing, have a water vapor permeability $\delta_{60°\,C}>6$, preferably >7, more preferably >8, and in particular >9 mg/h·m·bar or $\delta_{60°\,C}>286.4$, preferably >334.11, more preferably >381.84, and in particular >429.57 g·100 µm/m²·d.

Furthermore, this particular advantage is achieved in accordance with the invention by virtue of the fact that the aqueous solid-color topcoat materials or aqueous basecoat materials for use in accordance with the invention that comprise metal flake pigments are adjusted in terms of their material composition such that the solid-color topcoats or aqueous basecoats produced from them, after curing, have a water vapor permeability $\delta_{60°\,C}>4$, preferably >5, more preferably >6, and in particular >7 mg/h·m·bar or $\delta_{60°\,C}>190.92$, preferably >238.65, more preferably >286.4, and in particular >334.11 g·100 µm/m²·d.

The water vapor permeability may be determined in accordance with a very wide variety of methods, known from membrane technology. In accordance with the invention it is of advantage if the water vapor permeability is determined in accordance with ASTM F-1249 or is determined by introducing a certain amount of water into a glass crucible of defined aperture, firmly sealing the defined aperture of the glass crucible with the solid-color topcoat or aqueous basecoat in the form of a free membrane of defined thickness, removing projecting portions of the membrane to leave said membrane flush with the rim of the crucible, weighing the glass crucible with water and membrane, storing the system at a constant temperature above room temperature for a defined period, and then determining the weight loss.

The adjustment of the material composition of the aqueous solid-color topcoat or aqueous basecoat material may take place in any of a wide variety of ways. For example, the polyurethanes, crosslinking agents and/or pigments used may be varied so as to give the water vapor permeability that is essential to the invention.

In accordance with the invention, it is of advantage to adjust the water vapor permeability by adding (i) high-boiling ("long") organic solvents,
(ii) polyetherpolyols,
(iii) aqueous dispersion of at least one copolymer preparable by subjecting at least one olefinically unsaturated monomer to free-radical polymerization in the presence of at least one water-insoluble initiator in an aqueous dispersion of at least one polyurethane resin having a number-average molecular weight Mn of from 1000 to 30,000 daltons and containing on average per molecule from 0.05 to 1.1 polymerizable double bonds, the weight ratio between the polyurethane resin or mixture of polyurethane resins and the olefinically unsaturated monomer or mixture of olefinically unsaturated monomers being between 1:10 and 10:1; and/or
(iv) aqueous dispersion preparable by dispersing and homogenizing a mixture of at least one hydrophobic polyurethane resin, at least one olefinically unsaturated monomer, at least one surface-active substance, and water in a very high shear field, giving stabilized particles of said starting compounds in the aqueous phase, (co)polymerizing the olefinically unsaturated monomers within these particles, giving a dispersion of a hydrophobically modified core polymer, adding a mixture of olefinically unsaturated monomers including at least one hydrophilic olefinically unsaturated monomer to the dispersion of the hydrophobically modified core polymer, and copolymerizing the monomers in the presence of the core polymer, to give a hydrophilic shell polymer.

In the context of the present invention, hydrophilicity is the constitutional property of a molecule or functional group to penetrate the aqueous phase or to remain therein. Accordingly, in the context of the present invention, hydrophobicity is the constitutional property of a molecule or functional group to behave exophilically with respect to water, i.e., to display the tendency not to penetrate into water, or to depart the aqueous phase. For further details, reference is made to Römpp, op.cit., "Hydrophilicity", "Hydrophobicity", pages 294 and 295.

Examples of suitable long solvents (i) are triorganophosphates, especially trialkyl and/or tricycloalkyl phosphates such as tripropyl, tributyl, triamyl, trihexyl or tricyclohexyl phosphate, especially tributyl phosphate.

The amount of long solvents (i) in the aqueous solid-color topcoat or aqueous basecoat material may vary widely. Preferably it is from 0.1 to 10, more preferably from 0.2 to 8, with particular preference from 0.3 to 6, with very particular preference from 0.4 to 4, and in particular from 0.5 to 3% by weight, based in each case on the solid-color topcoat or aqueous basecoat material.

Suitable polyetherpolyols (ii) have hydroxyl numbers of from 35 to 1000 mg KOH/g and number-average molecular weights of from 180 to 5000 daltons. Polyetherpolyols (ii) are customary and known products and are marketed, for example, under the brandname Lupranol® by the company BASF Aktiengesellschaft.

The amount of polyetherpolyols (ii) in the aqueous solid-color topcoat or aqueous basecoat materials may likewise vary widely. Preferably it is from 0.5 to 20, more preferably from 0.6 to 18, with particular preference from 0.7 to 16, with very particular preference from 0.8 to 14, and in particular from 0.9 to 12% by weight, based in each case on the solid-color topcoat or aqueous basecoat material.

Appropriate aqueous dispersions (iii) are described in detail in German Patent DE 197 36 535 C1.

Appropriate aqueous dispersions (iv) are described in detail in European Patent Application EP 0 755 946 A2.

The amount of the aqueous dispersion (iii) and/or (iv) in the aqueous solid-color topcoat or aqueous basecoat material likewise may vary widely. Preferably it is from 2 to 40, more preferably from 3 to 35, with particular preference from 4 to 30, with very particular preference from 5 to 25, and in particular from 6 to 20% by weight, based in each case on the solid-color topcoat or aqueous basecoat material.

The solid-color and/or effect topcoats or multicoat color and/or effect coating systems produced in the manner of the invention have outstanding optical properties. Because of their surfaces free from popping marks and other surface defects, the effect of the colors, metallic effects and/or dichroic effects is particularly intense. Moreover, the multicoat system also exhibits an outstanding intercoat adhesion which is not reduced even by exposure in constant humidity condition.

EXAMPLES AND COMPARATIVE EXPERIMENT

Comparative Experiment C 1

The Preparation of an Aqueous Basecoat Material and Production of an Aqueous Basecoat in Noninventive Manner 31 parts by weight of an inorganic thickener (sodium-magnesium phyllosilicate, 3% strength in water) were charged to a dissolver. 16 parts by weight of an aqueous polyurethane dispersion prepared in accordance with Example 1, "Preparation of polyurethane resin dispersions", page 14 line 13 to page 15 line 27, especially section 1.3., page 15 lines 23 to 27, of International Patent Application WO 92/15405 were added and were mixed with the thickener with vigorous stirring.

Separately, 3.5 parts by weight of a polyester dispersion prepared in accordance with Example two, page 15 line 31 to page 16 line 22, of International Patent Application WO 92/15405 were charged to a stirred vessel and mixed with 5.5 parts by weight of a standard commercial, water-dilutable melamine-formaldehyde resin in isobutanol (Luwipal® LR 8968 from BASF Aktiengesellschaft) and 6 parts by weight of the polyurethane dispersion described above. The resultant mixture was mixed with the mixture described above.

Into the then resultant mixture there were incorporated by stirring, in succession, 2 parts by weight of ethylhexanol and 2.5 parts by weight of a surfactant solution comprising 50% by weight Surfynol® 100 (Air Products) and 50% by weight butyl glycol.

Separately, 3.4 parts by weight of a carbon black paste and 14.3 parts by weight of a green pigment paste were mixed with stirring and likewise incorporated with stirring into the above mixture. The carbon black paste, based on its total amount, consisted of 68.7% by weight of the above-described polyurethane dispersion, 5% by weight of the above-described polyester dispersion, 8.6% by weight of butyl diglycol, 7.6% by weight of deionized water and 10.1% by weight of carbon black. The green pigment paste consisted of 76.5% by weight of the above-described polyurethane dispersion and 23.5% by weight of Heliogen Green L 9361.

Separately, 3.5 parts by weight of a mixing varnish consisting, based on the mixing varnish, of 38.4% by weight of the above-described thickener, 6.8% by weight of the above-described melamine-formaldehyde resin solution, 38.4% by weight of the above-described polyurethane dispersion, 7.6% by weight of the above-described polyester dispersion and 8.8% by weight of 2-butoxyethanol, plus 1.2 parts by weight of the pearlescent pigment Merlin Super-green 839 Z, were formed into a paste and homogenized. The resultant pigment paste was added to the mixture described above.

The then resultant mixture was further admixed with 12 parts by weight of deionized water, and a pH from 7.6 to 8.2 was established using dimethylethanolamine (15 percent strength in water).

The popping limit of the resultant aqueous basecoat material was determined as follows.

A metal panel measuring 30 times 50 cm and coated with a surfacer coat was provided with an adhesive strip, in order to determine the film-thickness differences after coating. The aqueous basecoat material was applied electrostatically in the form of a wedge. The resultant aqueous basecoat film was flashed off at room temperature for one minute and then dried in a convection oven at 70° C. for 10 minutes.

Onto the dried aqueous basecoat film there was applied a customary and known two-component clearcoat material. The resultant clearcoat film was flashed off at room temperature for 20 minutes. Subsequently, the aqueous basecoat film and the clearcoat film were cured in a convection oven at 140° C. for 20 minutes.

Following the visual evaluation of the popping marks, the film thickness of the popping limit was determined. In the present case it was 23 μm.

To determine the water vapor permeability, the aqueous basecoat material was applied in uniform film thickness to a Stabylan panel measuring 12 times 12 cm, and cured. Thereafter, the aqueous basecoat was removed in the form of a film from the Stabylan panel and the thickness of the coating film was determined. It was 20 μm. At a defect-free area of the coating film, a section was punched out using a punch (diameter: 40 mm). A glass crucible (height: 2 cm; open surface: 4.9 cm$^2$) was filled part-way with deionized water. The projecting edge of the glass crucible was provided with a two-component adhesive (UHU-Plus Schnellfest) and the opening of the glass crucible was sealed with the punched-out section. Following the drying of the adhesive (two hours), the bonded coating film was cut off with a blade flush with the crucible edge. The test specimen was subsequently weighed on an analytical balance and stored in a convection oven at 60° C. for 24 hours. After this time, the weight loss (620 mg) was measured.

From the active surface, the film thickness, the water vapor pressure at 60° C. (0.199 bar), the test period (24 hours), and the temperature, the water vapor permeability was calculated as $\delta_{60° C.}$=5.3 mg/h·m·bar or $p_{60° C.}$=252.97 g·100 μm/m$^2$·d.

Example 1

The Preparation of an Aqueous Basecoat Material and Production of an Aqueous Basecoat by the Inventive Process Comparative Experiment C 1 was repeated but using tributyl phosphate (i) instead of 2-ethylhexanol.

The resultant aqueous basecoat had a water vapor permeability of $\delta_{60° C.}$=6.4 mg/h·m·bar or $p_{60° C.}$=267.07 g·100 μm/m$^2$·d. The popping limit was 27 to 28 μm.

Example 2

The Preparation of an Aqueous Basecoat Material and Production of an Aqueous Basecoat by the Inventive Process Comparative Experiment C 1 was repeated but 12.3 parts by weight of a dispersion (iii) prepared in accordance with page 3 line 56 to page 6 line 48 in conjunction with page 8 lines 49 and 50 of German Patent DE 197 36 535 C1 were used instead of the 16 parts by weight of the aqueous polyurethane dispersion in accordance with Example 1 "Preparation of polyurethane resin dispersions", page 14 line 13 to page 15 line 27, especially section 1.3, page 15 lines 23 to 27, of International Patent Application WO 92/15405.

The resultant aqueous basecoat had a water vapor permeability of $\delta_{60° C.}$=7.7 mg/h·m·bar or $p_{60° C.}$=367.52 g·100 μm/m$^2$·d. The popping limit was 28 to 29 μm.

Example 3

The Preparation of an Aqueous Basecoat Material and Production of an Aqueous Basecoat by the Inventive Process Comparative Experiment C 1 was repeated but 9.8 parts by weight of a dispersion (iv) prepared in accordance with Example 1, Example 2 and Example 3 in conjunction with Example 4, sample 1, page 8 line 1 to page 10 line 50, especially page 10, Table 1, column 2, of European Patent Application EP 0 755 946 A2 were used instead of the 16 parts by weight of the aqueous polyurethane dispersion in accordance with Example 1 "Preparation of polyurethane resin dispersions", page 14 line 13 to page 15 line 27, especially section 1.3, page 15 lines 23 to 27, of International Patent Application WO 92/15405.

The resultant aqueous basecoat had a water vapor permeability of $\delta_{60° C.}$=11.08 mg/h·m·bar or $p_{60° C.}$=525.03 g·100 μm/m$^2$·d. The popping limit was more than 34 μm.

Example 4

The Preparation of an Aqueous Basecoat Material and Production of an Aqueous Basecoat by the Inventive Process Comparative Experiment C 1 was repeated but in addition to 2-ethylhexanol 2 parts by weight of polyetherpolyol Lupranol® 3900 from BASF Aktiengesellschaft (number-average molecular weight 180 daltons; hydroxyl number 925 mg KOH/g) were used.

The resultant aqueous basecoat had a water vapor permeability of $\delta_{60° C.}$=6.5 mg/h·m·bar or $p_{60° C.}$=310.25 g·100 μm/m$^2$·d. The popping limit was 26 μm.

What is claimed is:

1. A process for producing a color and/or effect coating system on a substrate comprising one of
   A. a process comprising
      (I) applying at least one aqueous color and/or effect solid-color topcoat material to the substrate, to give at least one solid-color topcoat film, and
      (II) curing the at least one aqueous solid-color topcoat film, to give at least one color and/or effect solid-color topcoat; and
   B. a process comprising
      (I) applying at least one aqueous color and/or effect basecoat material to the substrate, to give at least one aqueous basecoat film,
      (II) at least one of flashing off and drying the at least one aqueous basecoat film, without curing it fully,
      (III) applying at least one clearcoat material to the at least one aqueous basecoat film, to give at least one clearcoat film, and
      (IV) jointly curing the at least one aqueous basecoat film and the at least one clearcoat film, to give a multicoat color and/or effect coating system comprising at least one color and/or effect basecoat and at least one clearcoat;

wherein the at least one color and/or effect aqueous basecoat material or the at least one aqueous color and/or effect solid-color topcoat material comprises
(1) at least one ionically and/or nonionically stabilized polyurethane binder that is one of saturated and unsaturated, and optionally grafted with olefinically unsaturated compounds, and
(2) at least one water vapor permeability adjusting additive, in an amount sufficient to prevent popping marks in the solid-color topcoat or basecoat, comprising at least one of
  (i) at least one aqueous dispersion of at least one copolymer prepared by a process comprising subjecting at least one olefinically unsaturated monomer to free-radical polymerization in the presence of at least one water-insoluble initiator in an aqueous dispersion of at least one polyurethane resin having a number-average molecular weight Mn of from 1000 to 30,000 daltons and containing on average per molecule from 0.05 to 1.1 polymerizable double bonds, the weight ratio between the at least one polyurethane resin and the at least one olefinically unsaturated monomer being between 1:10 and 10:1; and
  (ii) at least one aqueous dispersion prepared by a process comprising
    a. dispersing and homogenizing a mixture of at least one hydrophobic polyurethane resin, at least one olefinically unsaturated monomer, at least one surface-active substance, and water in a high shear field to give stabilized particles of materials in the mixture in an aqueous phase,
    b. (co)polymerizing the at least one olefinically unsaturated monomer within these particles to give a dispersion of a hydrophobically modified core polymer,
    c. adding a mixture of at least one olefinically unsaturated monomer comprising at least one hydrophilic olefinically unsaturated monomer to the dispersion of the hydrophobically modified core polymer, and
    d. copolymerizing the at least one hydrophilic olefinically unsaturated monomer in the presence of the core polymer, to give a hydrophilic shell polymer,
wherein
(a) the at least one aqueous color and/or effect solid-color topcoat material or the aqueous color and/or effect basecoat material contains no metal flake pigments, and which after curing gives a color and/or effect solid-color topcoat or color and/or effect basecoat having a water vapor permeability that is one of $\delta_{60°\,C.} > 6.0$ mg/h·m·bar and $p_{60°\,C.} > 286.4$ g·100 μm/m²·d, where d stands for day; or
(b) the at least one aqueous effect or color and effect solid-color topcoat material or aqueous effect or color and effect basecoat material comprises metal flake pigments, and which after curing gives an effect or color and effect solid-color topcoat or an effect or color and effect basecoat having a water vapor permeability that is one of $\delta_{60°\,C.} > 4.0$ mg/h·m·bar and $p_{60°\,C.} > 190.92$ g·100 μm/m²·d,
wherein the water vapor permeability of the at least one color and/or effect solid-color topcoat or the at least one color and/or effect basecoat is determined by ASTM F1249; and
the at least one solid-color topcoat or the at least one color and/or effect basecoat has a film thickness of 25 to 70 μm and is free from popping marks after curing.

2. The process of claim 1, wherein the at least one aqueous color and/or effect basecoat material and the aqueous color and/or effect solid-color topcoat material are one of i) physically curable and one of thermally self-crosslinkable and thermally externally crosslinkable, and ii) curable thermally and with actinic radiation.

3. A method to prevent popping marks in at least one of a color and/or effect solid-color topcoat and a color and/or effect basecoat comprising adding in an amount sufficient to prevent popping marks in the solid-color topcoat or basecoat at least one of
  (i) at least one aqueous dispersion of at least one copolymer prepared by a process comprising subjecting at least one olefinically unsaturated monomer to free-radical polymerization in the presence of at least one water-insoluble initiator in an aqueous dispersion of at least one polyurethane resin having a number-average molecular weight Mn of from 1000 to 30,000 daltons and containing on average per molecule from 0.05 to 1.1 polymerizable double bonds, the weight ratio between the at least one polyurethane resin and the at least one olefinically unsaturated monomer being between 1:10 and 10:1; and
  (ii) at least one aqueous dispersion prepared by a process comprising
    a. dispersing and homogenizing a mixture of at least one hydrophobic polyurethane resin, at least one olefinically unsaturated monomer, at least one surface-active substance, and water in a high shear field, to give stabilized particles of materials in the mixture in an aqueous phase,
    b. (co)polymerizing the at least one olefinically unsaturated monomer within these particles to give a dispersion of a hydrophobically modified core polymer,
    c. adding a mixture of at least one olefinically unsaturated monomer comprising at least one hydrophilic olefinically unsaturated monomer to the dispersion of the hydrophobically modified core polymer, and
    d. copolymerizing the at least one hydrophilic olefinically unsaturated monomer in the presence of the core polymer, to give a hydrophilic shell polymer;
to at least one of a color and/or effect solid-color topcoat material and an aqueous color and/or effect basecoat material in addition to an at least one ionically and/or nonionically stabilized polyurethane binder that is one of saturated and unsaturated, and optionally grafted with olefinically unsaturated compounds,
thereby adjusting water vapor permeability to a level sufficient to prevent popping marks in the color and/or effect solid-color topcoat or the color and/or effect basecoat; wherein the at least one color and/or effect solid-color topcoat or the at least one color and/or effect basecoat has a film thickness of 25 to 70 μm; and
wherein one of
  (a) the at least one aqueous color and/or effect solid-color topcoat material or the aqueous color and/or effect basecoat material contains no metal flake pigments, and which after curing gives a color and/or effect solid-color topcoat or color and/or effect basecoat having a water vapor permeability that is one of $\delta_{60°\,C.} > 6.0$ mg/h·m·bar and $p_{60°\,C.} > 286.4$ g·100 μm/m²·d, where d stands for day; or
  (b) the at least one aqueous effect or color and effect solid-color topcoat material or aqueous effect or color and effect basecoat material comprises metal flake pigments, and which after curing gives an effect or color and effect solid-color topcoat or an effect or color and effect basecoat having a water vapor permeability that is one of $\delta_{60°\,C.}$>4.0 mg/h·m·bar and $p_{60°\,C.}$>190.92 g·100 μm/m²·d,
wherein the water vapor permeability is determined by ASTM F1249.

4. The process according to claim 1 wherein additive (i) and/or additive (ii) is added in an amount from 2 to 40 percent by weight of the color and/or effect solid-color topcoat material or the aqueous color and/or effect basecoat material.

5. The process according to claim 4 wherein additive (i) and/or additive (ii) is added in an amount from 6 to 20 percent by weight of the color and/or effect solid-color topcoat material or the aqueous color and/or effect basecoat material.

6. The method according to claim 3 wherein additive (i) and/or additive (ii) is added in an amount from 2 to 40 percent by weight of the color and/or effect solid-color topcoat material or the aqueous color and/or effect basecoat material.

7. The method according to claim 6 wherein additive (i) and/or additive (ii) is added in an amount from 6 to 20 percent by weight of the color and/or effect solid-color topcoat material or the aqueous color and/or effect basecoat material.

8. The process according to claim 1 wherein the at least one solid-color topcoat or the at least one color and/or effect basecoat has a film thickness >30 μm and is free from popping marks after curing.

9. The method according to claim 3 wherein the at least one solid-color topcoat or the at least one color and/or effect basecoat has a film thickness >30 μm and is free from popping marks after curing.

10. The process according to claim 1, wherein the at least one polyurethane resin of additive (i) is prepared by reacting
(a) at least one polyester- and/or polyether polyol having a number-average molecular weight of from 400 to 5000 daltons, and
(b) at least one polyisocyanate, alone or together with at least one monoisocyanate, and
(c) at least one compound comprising at least one isocyanate-reactive group and at least one group which is capable of forming anions, or
(d) at least one compound comprising at least one NCO-reactive group and at least one poly(oxyalkylene) group, or
(e) a mixture of components (c) and (d), and
(f) optionally, at least one compound which in addition to a polymerizable double bond also comprises at least one further NCO-reactive group, and
(g) optionally, at least one hydroxyl—and/or amino-containing organic compound having a molecular weight of from 60 to 399 daltons.

11. The process according to claim 1, wherein the at least one olefinically unsaturated monomer of additive (i) subjected to free-radical polymerization is selected from the group consisting of
(α) aliphatic or cycloaliphatic esters of acrylic acid or methacrylic acid which contain neither hydroxyl nor carboxyl groups, and mixtures of such esters,
(β) ethylenically unsaturated monomers which carry at least one hydroxyl group in the molecule, and mixtures of such monomers,
(γ) ethylenically unsaturated monomers which carry at least one carboxyl group in the molecule, and mixtures of such monomers,
(δ) vinylaromatic hydrocarbons, styrene, alpha-alkylstyrene, vinyltoluene, acrylamides, methacrylamides, acrylonitriles, methacrylonitriles, and mixtures of such monomers,
(ε) polyunsaturated monomers, divinylbenzene, p-methyldivinylbenzene, o-nonyl-divinylbenzene, ethanediol di(meth)acrylate, 1,4-butanediol di(meth)acrylate, 1,6-hexanediol di(meth)acrylate, trimethylolpropane tri(meth)acrylate, pentaerythrityl di(meth)acrylate, allyl methacrylates, diallyl phthalates, butanediol divinyl ether, divinyl-ethyleneurea, divinylpropyleneurea, diallyl maleates
and mixtures thereof.

12. The process according to claim 11, wherein the at least one olefinically unsaturated monomer has from 40% to 100% by weight of component (α), from 0% to 30% by weight of component (β), from 0% to 10% by weight of component (γ), from 0% to 50% by weight of component (δ), and from 0% to 5% by weight of component (ε).

13. The process according to claim 1, wherein the homogenizing in a high shear field comprises passing the resin, unsaturated monomer, surface-active substance, and water through a high pressure impingement emulsifier at a pressure between 5,000 psi and 15,000 psi.

14. The process according to claim 1, wherein the stabilized particles have an average diameter between 100 nm and 300 nm.

15. The process according to claim 1, wherein the hydrophilic shell polymer is present from 25% to 75% by weight of the core-shell polymer.

* * * * *